United States Patent
Grilli et al.

(10) Patent No.: US 9,680,313 B2
(45) Date of Patent: Jun. 13, 2017

(54) AUTHORIZED BASED RECEIPT OF WIRELESS POWER

(75) Inventors: Francesco Grilli, La Jolla, CA (US); Roger Wayne Martin, San Diego, CA (US); MaryBeth Selby, San Jose, CA (US); David Maldonado, Chula Vista, CA (US); Stein Arne Lundby, Solana Beach, CA (US); Peng Li, San Diego, CA (US); Sandip S. Minhas, San Diego, CA (US); Khaled Helmi El-Maleh, San Marcos, CA (US); Yair Karmi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 12/856,545

(22) Filed: Aug. 13, 2010

(65) Prior Publication Data
US 2011/0119144 A1 May 19, 2011

Related U.S. Application Data

(60) Provisional application No. 61/262,119, filed on Nov. 17, 2009.

(51) Int. Cl.
| | |
|---|---|
| *G06Q 30/00* | (2012.01) |
| *G06F 17/30* | (2006.01) |
| *H02J 7/00* | (2006.01) |
| *G06Q 30/02* | (2012.01) |
| *G06Q 30/06* | (2012.01) |
| *H02J 7/02* | (2016.01) |
| *H02J 7/04* | (2006.01) |
| *H02J 17/00* | (2006.01) |
| *H04B 5/00* | (2006.01) |

(52) U.S. Cl.
CPC ........ *H02J 7/0004* (2013.01); *G06Q 30/0267* (2013.01); *G06Q 30/0601* (2013.01); *H02J 7/025* (2013.01); *H02J 7/041* (2013.01); *H02J 17/00* (2013.01); *H04B 5/0037* (2013.01)

(58) Field of Classification Search
CPC .......................... G06Q 30/0601; H02J 7/0004
USPC ................................................. 705/26.1–27.2
See application file for complete search history.

(56) References Cited

U.S. PATENT DOCUMENTS

| | | |
|---|---|---|
| 3,938,018 A | 2/1976 | Dahl |
| 6,031,354 A | 2/2000 | Wiley et al. |
| | (Continued) | |

FOREIGN PATENT DOCUMENTS

| | | |
|---|---|---|
| AU | 2006249578 A1 | 11/2006 |
| CN | 1836348 A | 9/2006 |
| | (Continued) | |

OTHER PUBLICATIONS

Frost & sullivan: Wireless power: The next wave in powering electronic devices says frost & sullivan. (Feb. 24, 2009). M2 Presswire Retrieved from http://search.proquest.com/docview/444334993?accountid=14753.*

(Continued)

*Primary Examiner* — Kathleen Palavecino
(74) *Attorney, Agent, or Firm* — Knobbe, Martens, Olson & Bear, LLP

(57) ABSTRACT

Exemplary embodiments are directed to methods and devices for fee-based wireless power. A method may include subscribing to a wireless power plan and receiving wireless power at one or more electronic devices according to a wireless power subscription.

38 Claims, 9 Drawing Sheets

(56) References Cited

U.S. PATENT DOCUMENTS

| | | | |
|---|---|---|---|
| 6,493,437 B1 | 12/2002 | Olshansky | |
| 7,502,619 B1 | 3/2009 | Katz | |
| 8,154,246 B1 | 4/2012 | Heitmann | |
| 8,169,185 B2 | 5/2012 | Partovi et al. | |
| 2002/0077130 A1 | 6/2002 | Owensby | |
| 2002/0087335 A1 | 7/2002 | Meyers et al. | |
| 2003/0013434 A1* | 1/2003 | Rosenberg et al. | 455/414 |
| 2003/0034757 A1 | 2/2003 | Woodnorth | |
| 2004/0017181 A1 | 1/2004 | Sakai | |
| 2004/0111360 A1 | 6/2004 | Albanese | |
| 2005/0038614 A1 | 2/2005 | Botts et al. | |
| 2006/0113955 A1 | 6/2006 | Nunally | |
| 2006/0133003 A1 | 6/2006 | Kular et al. | |
| 2006/0182074 A1 | 8/2006 | Kubler et al. | |
| 2006/0184705 A1 | 8/2006 | Nakajima | |
| 2006/0287763 A1 | 12/2006 | Ochi et al. | |
| 2007/0072474 A1 | 3/2007 | Beasley et al. | |
| 2007/0274226 A1 | 11/2007 | Tillotson | |
| 2008/0116847 A1 | 5/2008 | Loke et al. | |
| 2008/0122518 A1 | 5/2008 | Besser et al. | |
| 2008/0157603 A1* | 7/2008 | Baarman et al. | 307/104 |
| 2008/0197802 A1 | 8/2008 | Onishi et al. | |
| 2008/0210762 A1 | 9/2008 | Osada et al. | |
| 2008/0221986 A1 | 9/2008 | Soicher et al. | |
| 2008/0235332 A1 | 9/2008 | McChesney et al. | |
| 2008/0249873 A1 | 10/2008 | Seelinger | |
| 2008/0265835 A1 | 10/2008 | Reed et al. | |
| 2008/0305775 A1 | 12/2008 | Aaltonen et al. | |
| 2009/0058361 A1* | 3/2009 | John | 320/128 |
| 2009/0106137 A1 | 4/2009 | Ochi et al. | |
| 2009/0111492 A1* | 4/2009 | Dudley et al. | 455/466 |
| 2009/0119039 A1 | 5/2009 | Banister et al. | |
| 2009/0128086 A1 | 5/2009 | Lee | |
| 2009/0133733 A1 | 5/2009 | Retti | |
| 2009/0156268 A1 | 6/2009 | Kim et al. | |
| 2009/0215473 A1 | 8/2009 | Hsu | |
| 2009/0243397 A1 | 10/2009 | Cook et al. | |
| 2009/0251309 A1 | 10/2009 | Yamasuge | |
| 2009/0327150 A1 | 12/2009 | Flake et al. | |
| 2010/0034238 A1 | 2/2010 | Bennett | |
| 2010/0036773 A1 | 2/2010 | Bennett | |
| 2010/0167765 A1* | 7/2010 | Sarmah et al. | 455/466 |
| 2010/0171461 A1 | 7/2010 | Baarman et al. | |
| 2010/0174629 A1* | 7/2010 | Taylor et al. | 705/34 |
| 2010/0201314 A1 | 8/2010 | Toncich et al. | |
| 2010/0223136 A1* | 9/2010 | Wormald et al. | 705/14.64 |
| 2010/0223641 A1 | 9/2010 | Hubbard | |
| 2010/0253281 A1 | 10/2010 | Li | |
| 2010/0256831 A1* | 10/2010 | Abramo et al. | 700/292 |
| 2010/0276995 A1* | 11/2010 | Marzetta et al. | 307/11 |
| 2010/0323616 A1 | 12/2010 | Von Novak et al. | |
| 2011/0043327 A1 | 2/2011 | Baarman et al. | |
| 2011/0082727 A1 | 4/2011 | Macias | |
| 2011/0099065 A1* | 4/2011 | Georgis et al. | 705/14.52 |
| 2011/0115431 A1 | 5/2011 | Dunworth et al. | |
| 2011/0115432 A1 | 5/2011 | El-Maleh et al. | |
| 2011/0119135 A1 | 5/2011 | Grilli et al. | |
| 2012/0016748 A1 | 1/2012 | Aaltonen et al. | |
| 2012/0214536 A1* | 8/2012 | Kim | H02J 17/00 455/522 |

FOREIGN PATENT DOCUMENTS

| | | |
|---|---|---|
| CN | 1881674 A | 12/2006 |
| CN | 101056456 A | 10/2007 |
| CN | 101136556 A | 3/2008 |
| CN | 101136561 A | 3/2008 |
| CN | 101383435 A | 3/2009 |
| CN | 101447684 A | 6/2009 |
| CN | 101459981 A | 6/2009 |
| CN | 101520878 A | 9/2009 |
| CN | 101645618 A | 2/2010 |
| EP | 1528652 | 5/2005 |
| EP | 1667308 A2 | 6/2006 |
| EP | 1734635 A2 | 12/2006 |
| EP | 2071695 A2 | 6/2009 |
| FR | 2879852 | 6/2006 |
| GB | 2438485 A | 11/2007 |
| JP | H06133476 A | 5/1994 |
| JP | H0879984 A | 3/1996 |
| JP | H0918930 A | 1/1997 |
| JP | 09046282 | 2/1997 |
| JP | 2001025104 A | 1/2001 |
| JP | 2001136684 A | 5/2001 |
| JP | 2001298511 A | 10/2001 |
| JP | 2001359166 A | 12/2001 |
| JP | 2002077464 A | 3/2002 |
| JP | 2002135375 A | 5/2002 |
| JP | 2002534827 A | 10/2002 |
| JP | 2002359008 A | 12/2002 |
| JP | 2003091629 A | 3/2003 |
| JP | 2003299255 A | 10/2003 |
| JP | 2003348757 A | 12/2003 |
| JP | 2004050383 A | 2/2004 |
| JP | 2004056555 A | 2/2004 |
| JP | 2004128827 A | 4/2004 |
| JP | 2004258876 A | 9/2004 |
| JP | 2005505997 A | 2/2005 |
| JP | 2005110421 A | 4/2005 |
| JP | 2005160256 A | 6/2005 |
| JP | 2005261187 A | 9/2005 |
| JP | 2005328662 A | 11/2005 |
| JP | 2006517378 A | 7/2006 |
| JP | 2006353042 A | 12/2006 |
| JP | 2007114968 A | 5/2007 |
| JP | 2007180195 A | 7/2007 |
| JP | 2007526730 A | 9/2007 |
| JP | 2007274372 A | 10/2007 |
| JP | 2007288940 A | 11/2007 |
| JP | 2007295192 A | 11/2007 |
| JP | 2008021042 A | 1/2008 |
| JP | 2008206233 A | 9/2008 |
| JP | 2008236680 A | 10/2008 |
| JP | 2008295191 A | 12/2008 |
| JP | 2009037044 A | 2/2009 |
| JP | 2009523402 A | 6/2009 |
| JP | 2009148151 A | 7/2009 |
| JP | 2009183135 A | 8/2009 |
| JP | 2009253763 A | 10/2009 |
| JP | 2010515425 A | 5/2010 |
| JP | 2010152633 A | 7/2010 |
| JP | 2010525785 A | 7/2010 |
| TW | I268429 | 12/2006 |
| TW | 200824215 A | 6/2008 |
| TW | I302245 | 10/2008 |
| TW | 200917611 A | 4/2009 |
| TW | 200941889 A | 10/2009 |
| WO | WO0039908 A1 | 7/2000 |
| WO | WO200054387 | 9/2000 |
| WO | WO03047064 A2 | 6/2003 |
| WO | WO2004114433 | 12/2004 |
| WO | WO-2006067350 A1 | 6/2006 |
| WO | WO2006127185 A2 | 11/2006 |
| WO | 2008133806 A1 | 11/2008 |
| WO | WO2008137996 A1 | 11/2008 |
| WO | 2009014125 A1 | 1/2009 |
| WO | WO2009009559 | 1/2009 |
| WO | WO-2009047769 A2 | 4/2009 |
| WO | WO-2009111597 A2 | 9/2009 |
| WO | WO2010036980 A1 | 4/2010 |
| WO | WO2010118161 | 10/2010 |
| WO | WO2011063054 | 5/2011 |

OTHER PUBLICATIONS

Robinson, Stuart. "Wireless Charging Will Quadruple Potential Combined Speed Charging" (Strategy Analytics, Inc.) Jul. 28, 2009.
International Search Report and Written Opinion—PCT/US2010/057117, ISA/EPO—May 17, 2011.
International Search Report and Written Opinion—PCT/US2010/057118—ISA/EPO—Apr. 27, 2011.

International Search Report and Written Opinion—PCT/US2010/057121, ISA/EPO—May 13, 2011.
International Search Report and Written Opinion—PCT/US2010/057122—ISA/EPO—May 26, 2011.
Taiwan Search Report—TW099139574—TIPO—Nov. 13, 2013.
Anhiroshi K., "CES 2009—3D Games and Non-Contact Charging Base Appeared in the Annual Two Days before the Event," Jan. 8, 2009, 6 pages. Retrieved from the internet: URL: http://news.mynavi.jp/articles/2009/01/08/ces01/>.

* cited by examiner

AUTHORIZED BASED RECEIPT OF WIRELESS POWER

CLAIM OF PRIORITY UNDER 35 U.S.C. §119

This application claims priority under 35 U.S.C. §119(e) to:

U.S. Provisional Patent Application 61/262,119 entitled "WIRELESS POWER" filed on Nov. 17, 2009, the disclosure of which is hereby incorporated by reference in its entirety.

BACKGROUND

Field

The present invention relates generally to wireless power, and more specifically, to methods and systems related to authorized based receipt of wireless power.

Background

Typically, each device powered by a chargeable battery may require its own charger and power source, which is usually an AC power outlet. This becomes unwieldy when many devices need charging.

Approaches are being developed that use over the air power transmission between a transmitter and the device to be charged (i.e., energy transfer that does not require a wire connection between the charger and the device being charged). For example, energy may be transferred by means of coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So, typically, applying this charging solution over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for enhanced systems and methods for transferring wireless power to authorized users, as well as preventing the transfer of power to unauthorized users.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors. It is noted that the present invention may be applicable to any suitable wireless power techniques, such as near-field, far-field, resonant, and induction.

Figure 1:
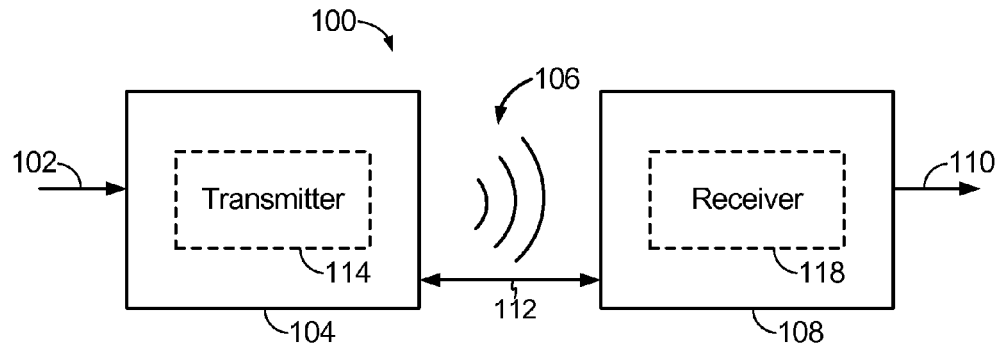
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
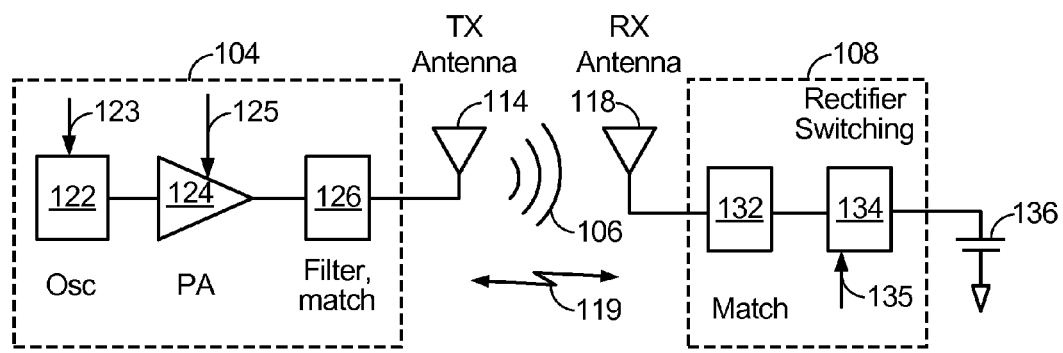
FIG. 2 shows a simplified schematic diagram of a wireless power transfer system.

FIG. 2 shows a simplified exemplary schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
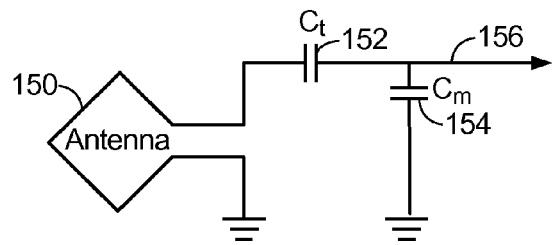
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
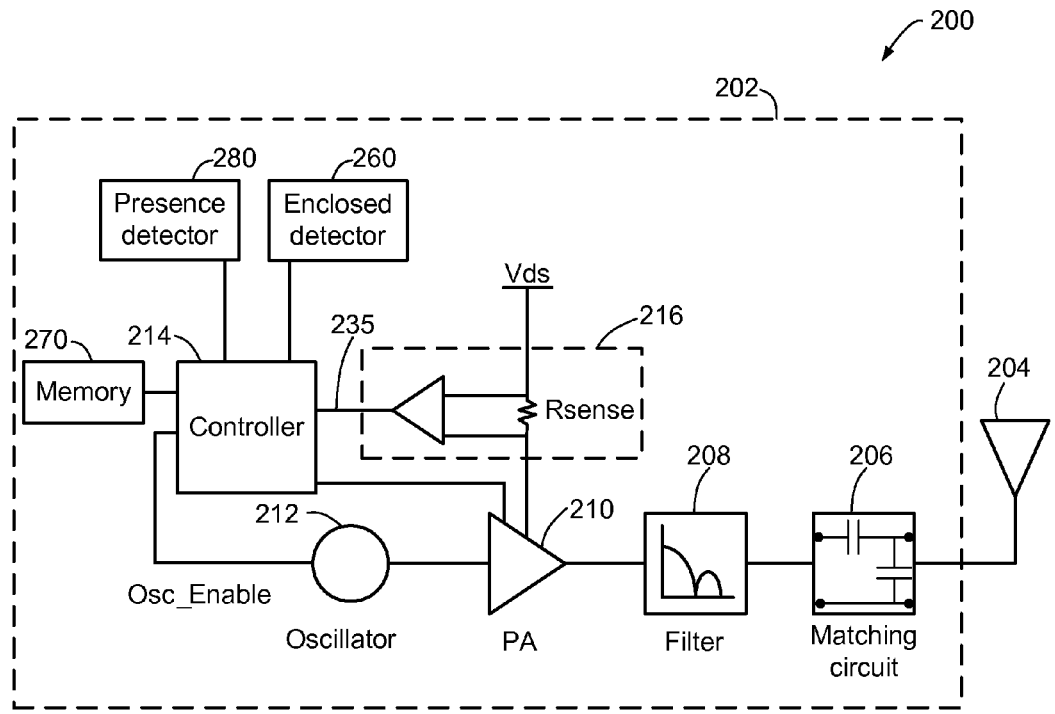
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
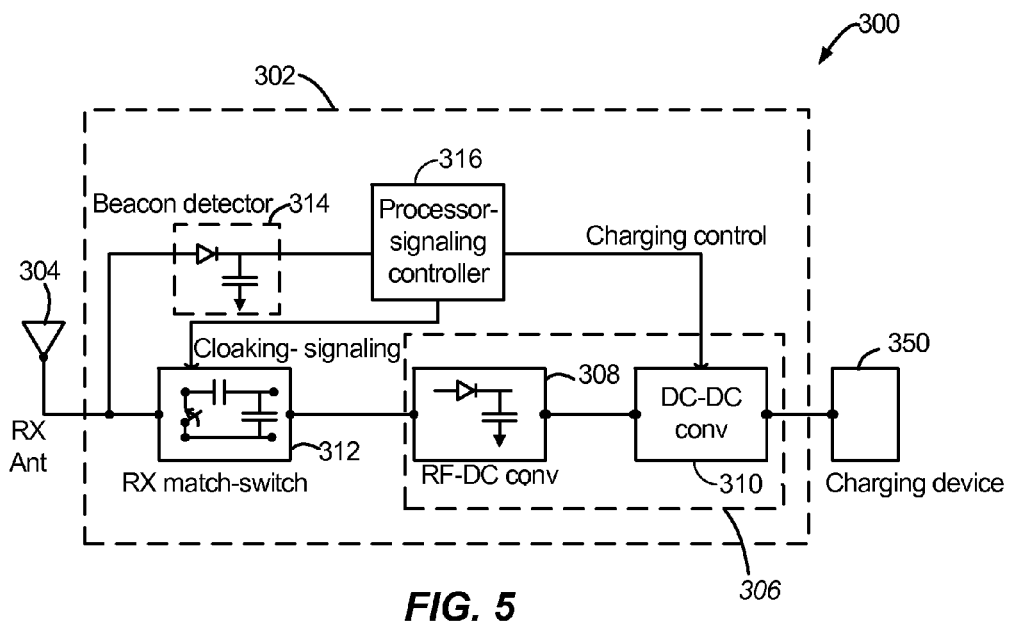
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
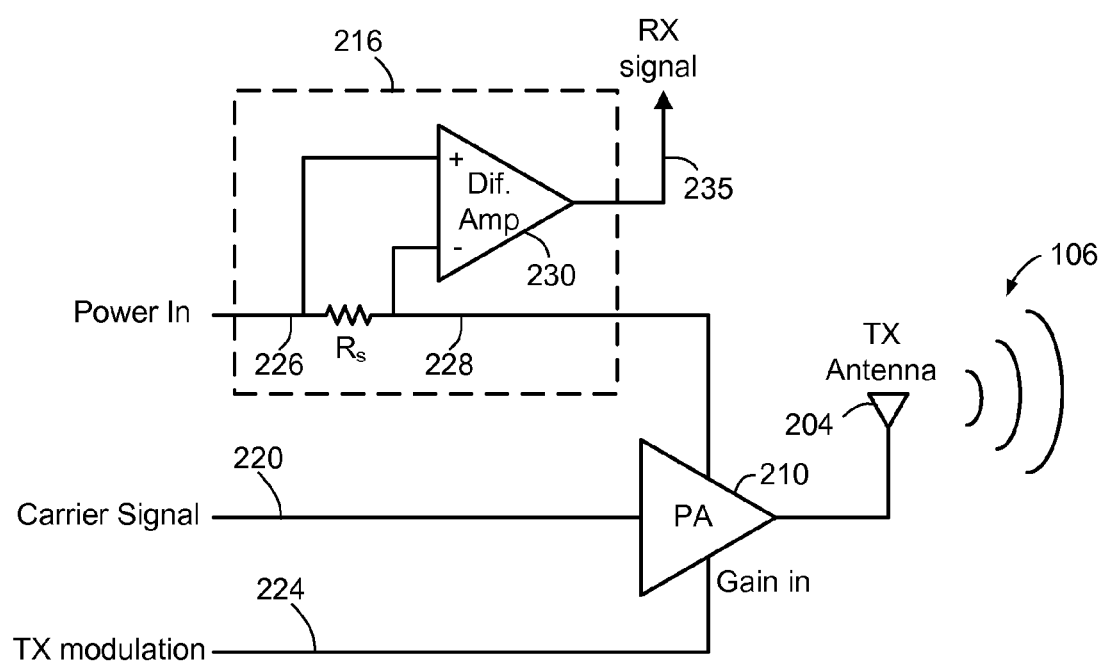
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

As used herein, the term "entity" may refer to any entity involved in providing wireless power. For example, an "entity" may include a business entity, a wireless power service provider, a third party in agreement with a business establishment or a service provider, or any combination thereof. Furthermore, as used herein, the term "data mining" may refer to a variety of techniques for performing an operation on an electronic device to capture data pertaining to the electronic device (e.g., a location of the device or a type of device) or a user of the electronic device (e.g., the user's interests, behavior and preferences, the user's age, etc.). Furthermore, as used herein, "advertisement" may refer to information including, but not limited to, promotional information, news-based information, account information, terms or conditions information, any of which may include text, audio, image, video, or any combination thereof.

As will be understood by a person having ordinary skill in the art, a business establishment (e.g., a coffee shop) may provide wireless power to customers who visit the establishment. More specifically, as an example, wireless power access may be provided by a business establishment, a service provider, a third party in agreement with a business establishment or a service provider, or any combination thereof. Furthermore, it is noted that a wireless charger, in addition to being positioned within a business establishment, may be positioned within, for example only, a library, an educational facility, a wireless power station, or a public transportation vehicle (e.g. a bus or a train). Accordingly, an entity may establish a wireless power service, for example, within a business, a public facility, or at an independent wireless power station, similar to a legacy telephone booth or a rest stop along a highway.

Various exemplary embodiments of the present invention, as described herein, relate to methods of transferring power to one or more electronic devices. More specifically, a method may include transferring wireless power to at one or more electronic devices, wherein a user of the one or more electronic devices has provided some form of payment to an entity. For example, the user has paid for a wireless power subscription, or has purchased a product (e.g., a cup of coffee) or a service from a business establishment. Furthermore, electronic devices, which are associated with users who having not provided a form a payment to an entity, are not availed of a significant amount of wireless power from the entitiy.

Other various exemplary embodiments of the present invention relate to methods of receiving wireless power at one or more electronic devices according to fee-based wireless power plans. More specifically, a method may include receiving wireless power at one or more electronic devices, wherein a user of the one or more electronic devices has provided some form of payment to an entity. As an example, a method may include receiving wireless power at one or more electronic devices after purchasing a subscription for wireless power. As another example, a method may include purchasing a product, a service, or both, and, thereafter, receiving wireless power at one or more electronic devices.

Figure 7B:
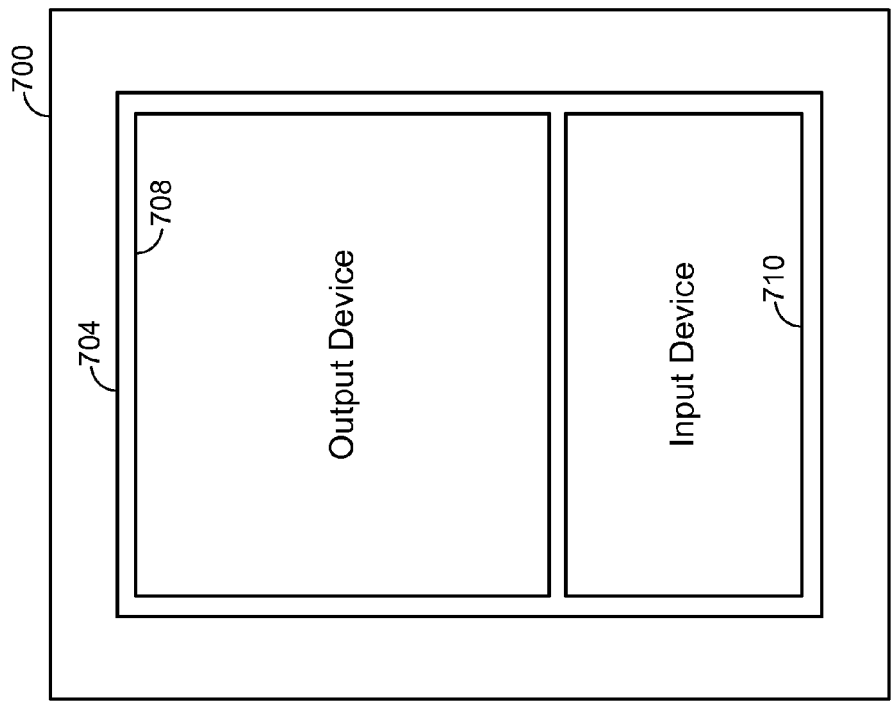
FIG. 7B is another depiction of the electronic device of FIG. 7A.
Figure 7A:
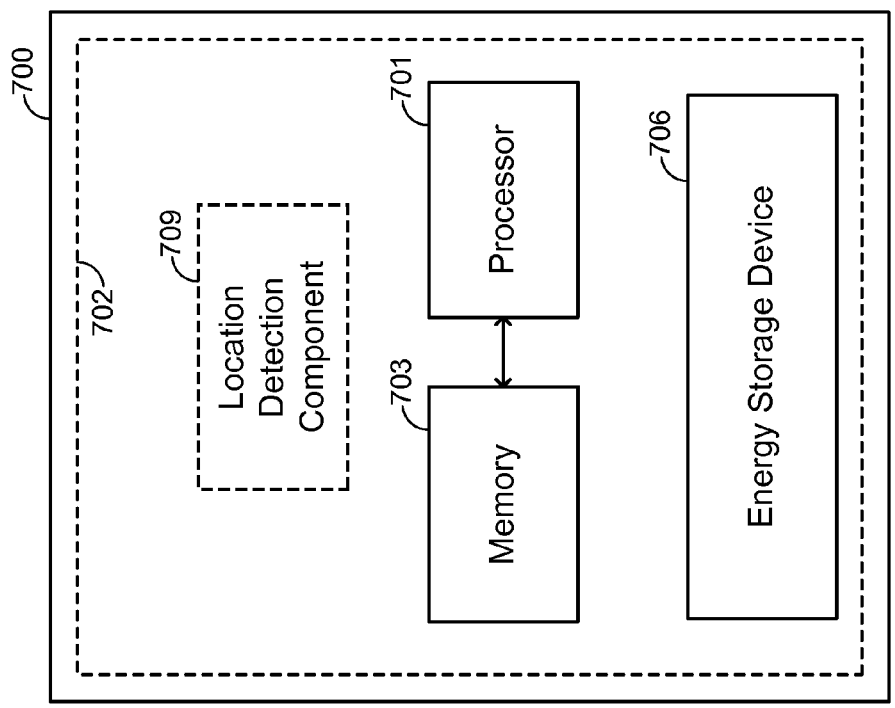
FIG. 7A illustrates a block diagram of an electronic device.

FIG. 7A illustrates a block diagram of an electronic device 700, which may comprise any known electronic device configured for receiving wireless power. For example only, electronic device 700 may comprise a mobile telephone, a personal computer, a media player, a gaming device, or any combination thereof. By way of example only, electronic device 700 may comprise a receiver (not shown in FIG. 7A; see e.g., receiver 300 of FIG. 5) and at least one associated receive antenna 702. Electronic device 700 may further include an energy storage device 706, which may comprise, for example, a battery. According to one exemplary embodiment described more fully below, electronic device 700 may comprise, or may be operably coupled to, a location detection component 709, such as a WiFi-dependent locator or a global positioning system (GPS) receiver. Electronic device 700 may further include a memory 703 and one or more processors 701 for executing various exemplary embodiments of the present invention as described herein.

FIG. 7B is another illustration of electronic device 700. As illustrated in FIG. 7B, electronic device 700 may include a user interface 704 having an output device 708 and an input device 710. As will be appreciated by a person having ordinary skill in the art, output device 708 may comprise a display device configured to display audio, video, text, graphics, and the like.

Figure 8:
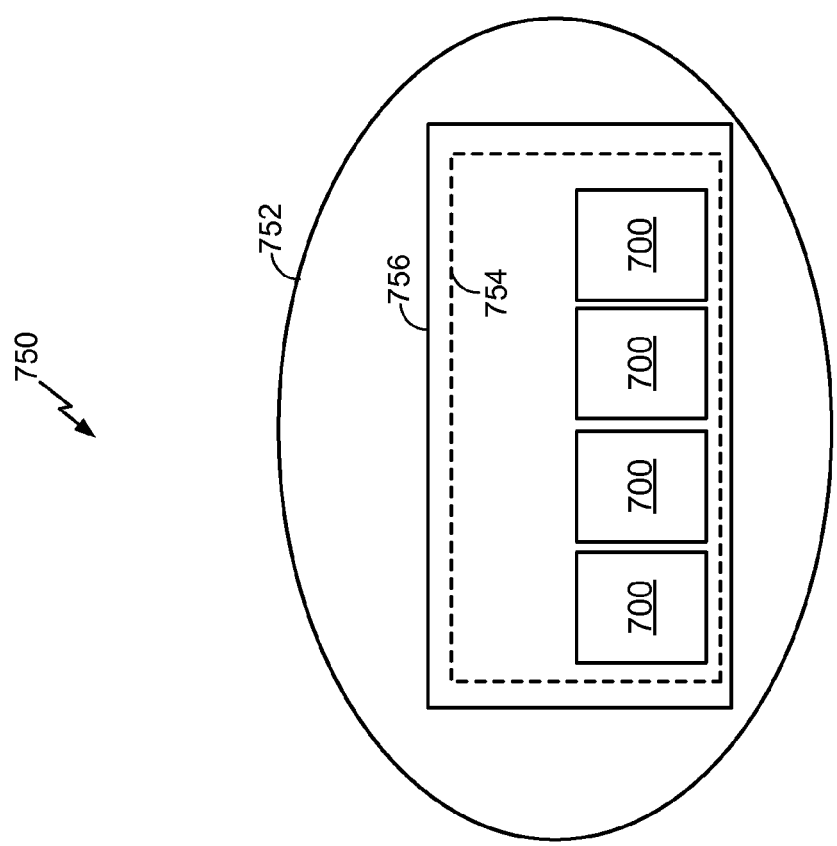
FIG. 8 depicts a wireless system including an entity and a plurality of electronic devices.

FIG. 8 illustrates a wireless power system 750 including one or more electronic devices 700 and an entity 752, which may comprise, for example only, a service provider (i.e., an entity that provides wireless power), a business establishment (e.g., a coffee shop), a third party in agreement with a service provider or a business establishment, or a combination thereof. It is noted that in a manner similar to providing WiFi access, an entity, such as a business or an airport, or another entity may be responsible for verifying that a fee has been paid, and for the operation of one or more associated wireless chargers. Entity 752 may comprise one or more wireless chargers 756, may be associated with one or more wireless chargers 756, or any combination thereof. Each wireless charger 756 may comprise a transmitter (not shown in FIG. 8; see e.g., transmitter 200 of FIG. 4) and at least one associated transmit antenna 754. Wireless charger 756 may be configured to wirelessly transmit power within an associated charging region. Furthermore, power transmitted by wireless charger 756 may be received by one or more electronic devices, which are positioned within a charging region of wireless charger 752.

In accordance with other various exemplary embodiments of the present invention, a customer may receive wireless power from one or more wireless chargers in exchange for a fee. For example, according to one exemplary embodiment, a user may purchase a subscription to receive wireless power. According to another example, a user may receive wireless power after purchasing a product or a service.

To decrease costs associated with transferring wireless power to customers, an entity (e.g., a business establishment or a service provider) may associate with a third party and deliver one or more advertisements to customers. Additionally, before transferring wireless power to a customer's electronic device, an entity may require that the customer agree to allow the entity to perform one or more data mining operations on the customer's wirelessly chargeable device. Furthermore, according to other various exemplary embodiments, in addition to payment of a fee, a user may agree to at least one condition as determined by entity 752. Stated another way, prior to enabling wireless power to be transmitted to the at least one electronic device 700, entity 752 may require a user of the at least one electronic device 700 to agree to one or more operations being performed on the at least one electronic device 700. Moreover, prior to, or while, transferring wireless power to the at least one electronic device 700, entity 752 may cause one or more operations to be performed on electronic device 700.

As one example, prior to, or while, transferring wireless power to the at least one electronic device 700, entity 752 may transmit one or more advertisements to the at least one electronic device. Furthermore, upon receipt of the one or more advertisements at the at least one electronic device 700, entity 752 may cause the one or more advertisements to be conveyed (e.g., displayed) by the electronic device 700. As another example, prior to, or while, transferring wireless power to the at least one electronic device 700, entity 752 may be configured to perform one or more data mining operations on electronic device 700 to gather various forms of information.

As noted above, according to various exemplary embodiments of the present invention, a user may receive wireless power in exchange for a fee. For example, according to one exemplary embodiment, a user may purchase a subscription to receive wireless power. In contrast to the exemplary embodiments related to advertisement-based charging methods or data mining-based charging methods, subscription-based charging may enable a user to purchase a wireless power subscription, which may enhance a wireless power scenario. For example, subscription-based charging, according to one or more exemplary embodiments, may give a user (i.e., a customer) priority access to wireless power, eliminate or decrease exposure to advertisements, eliminate or decrease exposure to data mining surveillance, or any combination thereof.

According to one exemplary embodiment, wireless power subscription plans may include various services with varying costs, and varying types and levels of service. For example, a user may purchase a "silver" plan, a "gold" plan, or a "platinum" plan, wherein the "platinum" plan is the highest level of service at the highest subscription price and the "silver" plan is the lowest level of service at the lowest subscription price. In one example wherein multiple users are attempting to receive wireless power from a single wireless power source, a user with a platinum plan may take priority over users with either a gold plan or a silver plan. Stated another way, users that have subscribed to a platinum plan may receive wireless power prior to users that have subscribed to either a gold or silver plan. Similarly, a user with a gold plan may take priority over users with a silver plan. Additionally, priority may be based on an amount of available power within an electronic device. More specifically, for example, an electronic device having little or no stored charge may take priority over an electronic device having a full charge. Moreover, it is noted that a wireless power operator, which is associated with an entity, may control an amount of power available to a user.

According to various exemplary embodiments of the present invention, a wireless power subscription may be at least partially based on (e.g., limited to) one or more parameters (e.g., energy, time, or location). More specifically, as an example, one or more wireless chargers may convey wireless power to one or more electronic devices according to a location-based subscription, an energy-based subscription, a time-based subscription, or any combination thereof. For example, a subscription may enable a subscriber to receive wireless power within a geographical area (e.g., within a city limit) or within a specific entity (e.g., only within designated stores). Moreover, a subscription may be subject to limits in total energy received per time period (e.g., per day), or a time of day in which power may be received. It is noted that a price of wireless power may increase for power received outside of a designated location. Moreover, a price of wireless power may increase for power received at time periods that are not included in a subscription or for energy levels that exceed a total energy limit. Further, a subscription may be subject to fee for each per charge, per energy received, per energy transmitted, or the like. According to other exemplary embodiments, a subscription may provide for global access and may be unlimited relative to time and energy received.

Additionally, a wireless power subscription may enable a user to configure an associated electronic device to receive wireless upon a charge stored in the electronic device dropping below a threshold amount. As another example, a time at which power may be received, and an amount of power received, may be based on anticipated power requirements or by a remaining amount of charge stored in the electronic device. According to one exemplary embodiment, a wireless power subscription may be for emergency power purposes only (e.g., when power available in an associated device is below a threshold).

Furthermore, levels of exposure to advertisements, data mining surveillance, or both, may vary according to subscription levels. For example, as the level of service increases and, therefore, the cost of the subscription increases, the number of advertisements that a user receives may decrease, the number or type of data mining operations that a user is exposed to may decrease, or both. As a more specific example, a user, which has purchased a platinum subscription plan, may receive wireless power without having to receive or view any advertisements or be free from any data mining operations. Furthermore, in this example, a user, which has purchased a gold subscription plan, may receive a limited number of advertisements prior to, while, or after receiving wireless power. Continuing with this example, a user, which has purchased a silver subscription plan, may receive a number of advertisements greater than the number of advertisements received by the gold subscription user.

As another example, a subscription-based plan may provide for data mining surveillance and no advertising. Accordingly, in the subscription plan, a customer may receive wireless power at an associated electronic device in return for a fee and, furthermore, may enable entity 752 to perform one or more data mining operations on the electronic device. As will be appreciated by a person having ordinary skill in the art, data collected via one or more data mining operations may be used for various purposes. For example, entity 752 may collect information from electronic device 700 about the power usage habits of an associated customer and, thereafter, entity 752 may provide the customer with alternative subscription plans that may optimize cost and the quality of service in consideration of monitored usage habits. According to another exemplary embodiment, entity 752 may regulate and monitor the wireless power services being offered. For example, entity 752 may control a frequency setting of a resonant transmit source of the wireless power system provided in accordance with the number and type of devices utilizing a system at a given point in time.

It is noted that a user (i.e., a customer) may configure an associated electronic device (e.g., electronic device 700) to receive wireless power upon request or upon one or more criteria being met. For example, upon a charging level of an associated energy storage device 706 dropping below a threshold value, electronic device 700 may be configured to receive wireless power according to a subscription-based plan. As another example, electronic device 700 may be configured to receive wireless power in anticipation of future power usage. More specifically, for example, via accessing an associated electronic calendar, electronic device 700 may predict an amount of power required for future use and, accordingly, may request and receive wireless power according to a subscription-based plan. It is further noted that a wireless power subscription may comprise any suitable time period, such as a year, month-to-month, etc. Accordingly, this type of subscription may require payment of a reoccurring fee. Additionally, a user may purchase credits, which may be subsequently exchanged for wireless power. Furthermore, a fee may be strictly based on an amount of energy received. Stated another way, rather than paying for a monthly or yearly subscription, a user may pay per use and only for the wireless power that is actually received.

One exemplary embodiment may comprise a subscription that has no, or a small, basic fee, an in which a user has previously agreed to pay for wireless power. The user may either automatically accept wireless power when required by an associated electronic device and when in range of suitable charging station, or the electronic device may automatically receive wireless power from a preferred wireless charger (e.g., a lowest cost wireless charger), which is associated with the subscription and positioned within range. Alternatively, the electronic device may display a list of available wireless chargers to a user and, in response thereto, a user may select none or one or more wireless chargers to receive wireless power therefrom. Additionally, it is noted that a subscription may be pre-authorized, so a user may not be required to provide authorization each time prior to receiving wireless power.

According to another exemplary embodiment, a user may receive wireless power after purchasing a product, a service, or both, from entity 752. As one example, a user, after purchasing a product, a service, or both, may receive an access key, which may enable the user to receive wireless power. Furthermore, according to an exemplary embodiment, after purchasing a product, a service, or both, a user may receive coupon, which may enable the user to receive wireless power at a future time. In another exemplary embodiment, after purchasing a product or a service, a user's electronic device may be loaded with a charging code. For example, the code may be loaded by placing the electronic device on a pad and receiving the code via short-range communication, such as BlueTooth or Zigee, or by correlating a proximity or physical connection over a network (e.g., a LAN or a WAN).

As mentioned above, subscription-based charging may be implemented within a business establishment. Furthermore, subscription based charging may be implemented in an office or educational setting. For example, a university or company may purchase a wireless power subscription, similar to a manner in which a business or university may purchase wireless internet service. The purchased subscription may provide access based on restrictions, such that only those students or employees that are authorized to use the service may receive wireless power.

Figure 9:
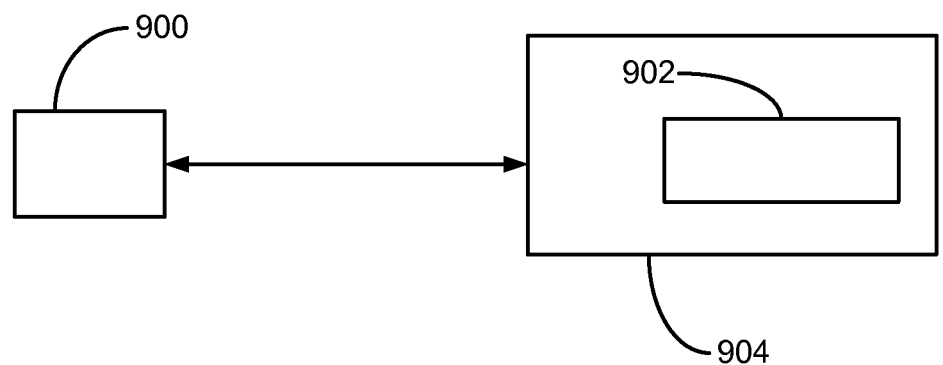
FIG. 9 illustrates a wireless charger and an electronic device, according to an exemplary embodiment of the present invention.
Figure 10:
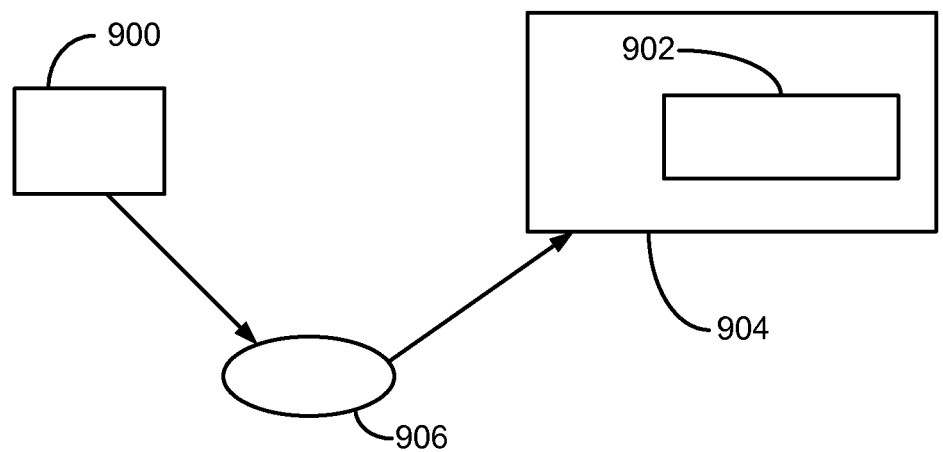
FIG. 10 illustrates a wireless charger, a router, and an electronic device, in accordance with an exemplary embodiment of the present invention.

With reference to FIGS. 9 and 10, various methods of restricting access to wireless power will now be described. With specific reference to FIG. 9, according to one exemplary embodiment, a subscriber (i.e., a customer), which is associated with an electronic device 900 and which has been provided with an access code may utilize the access code to receive access to wireless power transmitted from a wireless charger 902 of an entity 904. According to another exemplary embodiment illustrated in FIG. 10, access may be provided in conjunction with a router 906, which may act as a gatekeeper to an associated wireless power system of entity 904. More specifically, an access code may be provided from a subscriber, which is associated with electronic device 900, to router 906. After receiving an appropriate access code from the subscriber, router 906 may enable wireless power to be transmitted from wireless charger 902 to electronic device 902. Accordingly, access to wireless power may be provided to authorized subscribers while unauthorized subscribers may be denied access. It is noted that router 906 may further be employed in conjunction with a wireless internet router to provide access to wireless internet, wireless power, or both.

Figure 11:
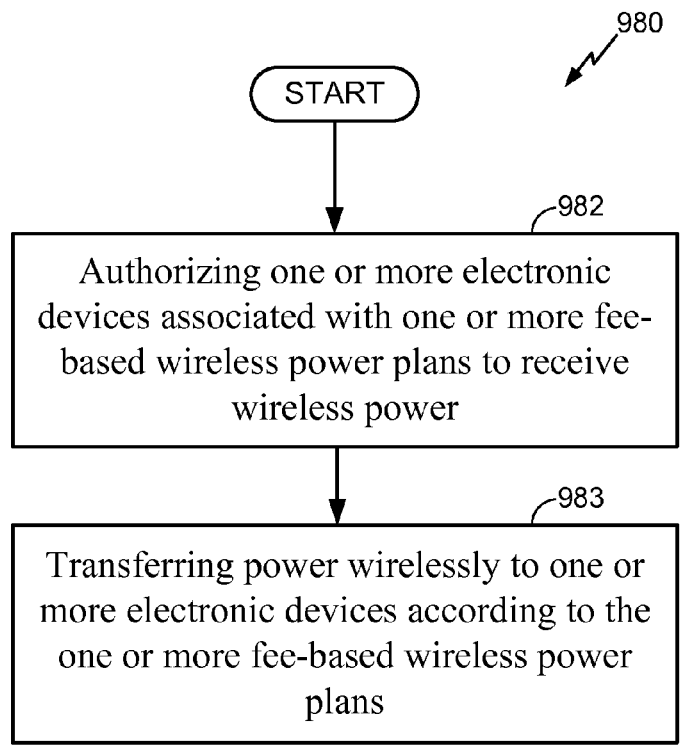
FIG. 11 is a flowchart illustrating a method, according to an exemplary embodiment of the present invention.

FIG. 11 is a flowchart illustrating a method 980, in accordance with one or more exemplary embodiments. Method 980 may include authorizing one or more electronic devices associated with one or more fee-based wireless power plans to receive wireless power (depicted by numeral 982). Method 980 may also include transferring wireless power to one or more electronic devices according to one or more fee-based wireless power plans (depicted by numeral 983).

Figure 12:
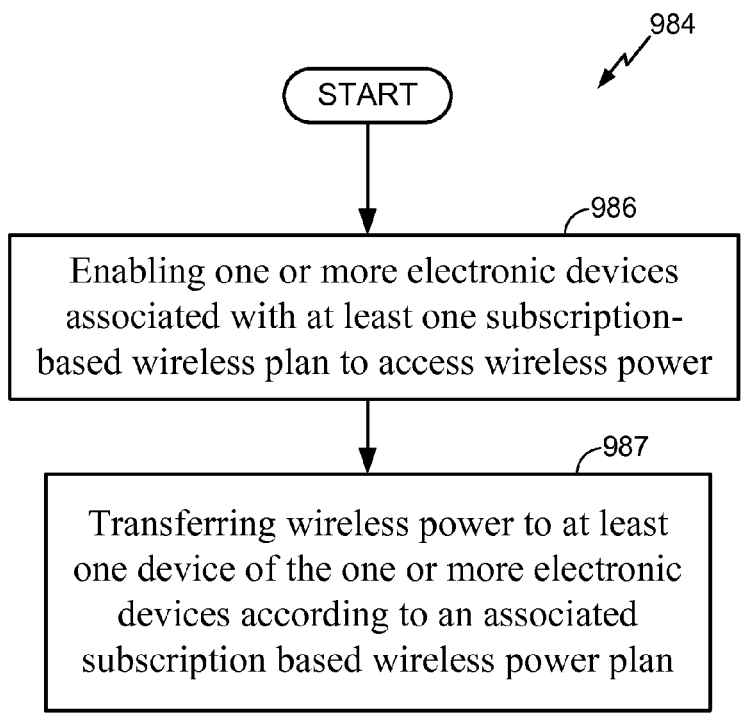
FIG. 12 is a flowchart illustrating another method, according to an exemplary embodiment of the present invention.

FIG. 12 is a flowchart illustrating another method 984, in accordance with one or more exemplary embodiments. Method 984 may include enabling one or more electronic devices associated with at least one subscription-based wireless plan to access wireless power (depicted by numeral 986). Method 984 may further include transferring wireless power to at least one device of the one or more electronic devices according to an associated subscription based wireless power plan (depicted by numeral 987).

Figure 13:
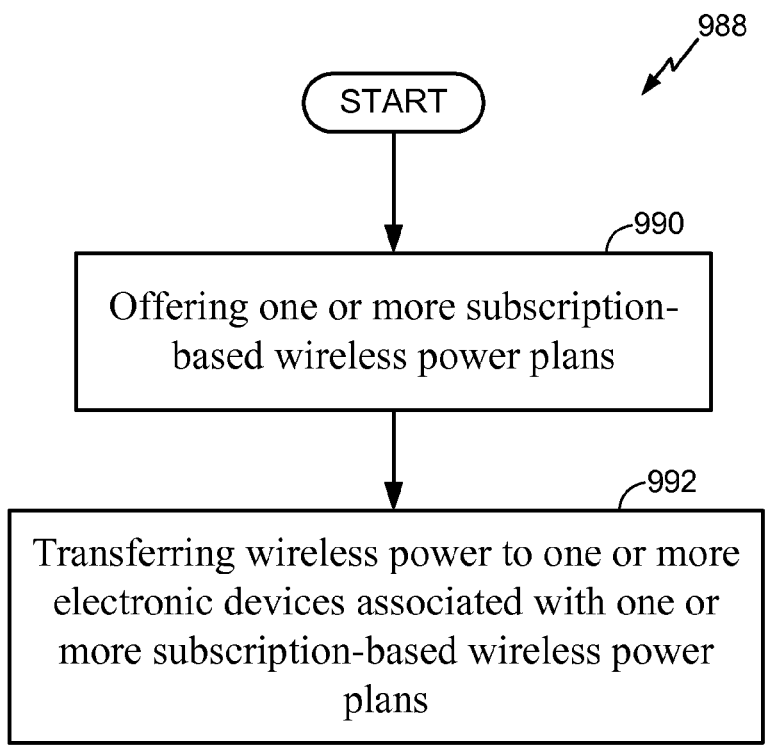
FIG. 13 is a flowchart illustrating yet another method, according to an exemplary embodiment of the present invention.

FIG. 13 is another flowchart illustrating yet another method 988, in accordance with one or more exemplary embodiments. Method 988 may include offering one or more subscription-based wireless power plans (depicted by numeral 990). Method 988 may also include transferring wireless power to one or more electronic devices associated with one or more subscription-based wireless power plans (depicted by numeral 992).

Figure 14:
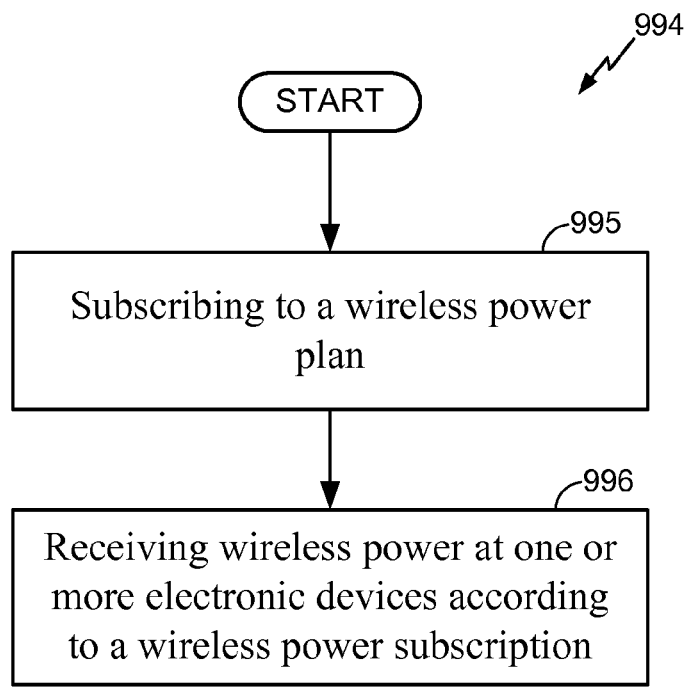
FIG. 14 is a flowchart illustrating another method, according to an exemplary embodiment of the present invention.

With reference to the flowchart in FIG. 14, another method 994, in accordance with one or more exemplary embodiments, is illustrated. Method 994 may include subscribing to a wireless power plan (depicted by numeral 995). Method 994 may also include receiving wireless power at one or more electronic devices according to a wireless power subscription (depicted by numeral 996).

Figure 15:
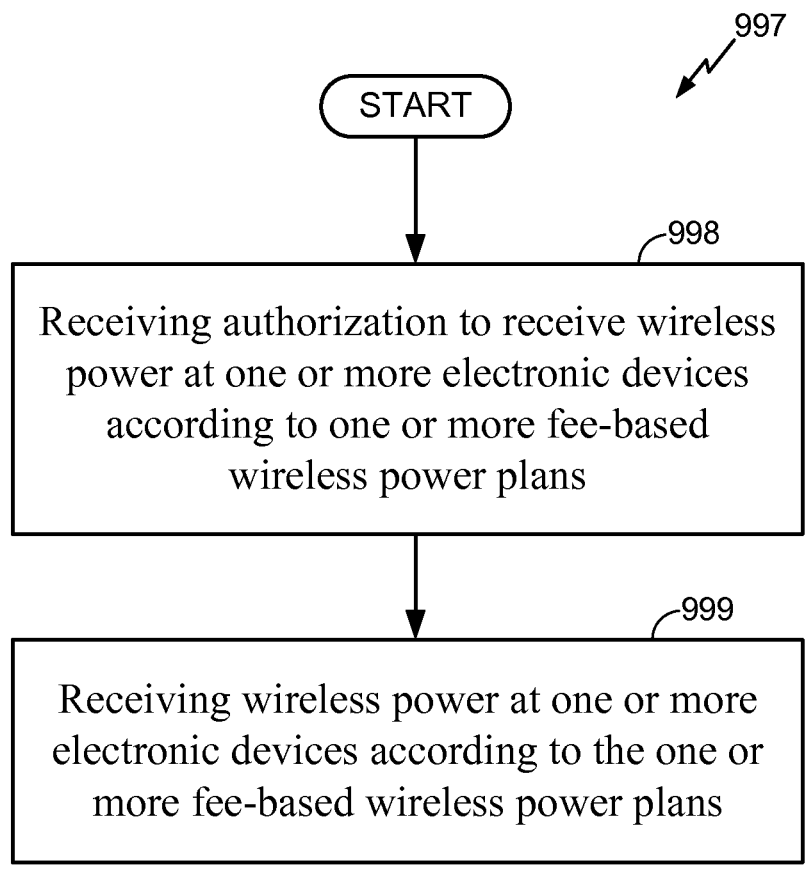
FIG. 15 is a flowchart illustrating yet another method, according to an exemplary embodiment of the present invention.

FIG. 15 is a flowchart illustrating yet another method 997, in accordance with one or more exemplary embodiments. Method 997 may include receiving authorization to receive wireless power at one or more electronic devices according to one or more fee-based wireless power plans (depicted by numeral 998). Method 997 may further include receiving wireless power at one or more electronic devices according to the one or more fee-based wireless power plans (depicted by numeral 999).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method of transferring power wirelessly, the method comprising:
    authorizing, via a wireless power transmitter, one or more electronic devices to receive power, the authorization at least partially based on a subscription level of one of one or more wireless power plans, each wireless power plan associated with at least one of the electronic devices, wherein the one or more wireless power plans comprise:
        a first subscription level having a first priority level and a first energy limit associated with a first subscription price; and
        a second subscription level having a second priority level and a second energy limit associated with a second subscription price, the first priority level and the first energy limit being higher than the second priority level and the second energy limit; and
    transferring power wirelessly, via the wireless power transmitter, to each authorized electronic device at least partially based on the associated wireless power plan, wherein transferring power wirelessly comprises prioritizing the transfer of the power to the one or more electronic devices based on the subscription level of the one or more wireless power plans associated with each authorized electronic device of the one or more electronic devices.

2. The method of claim 1, wherein a wireless power plan of the one or more wireless power plans authorizes electronic devices to receive power based on at least one of a location of an electronic device of the one or more electronic devices, a total amount of power transferred according to the wireless power plan, an amount of power for the electronic device, and a time of authorization of the electronic device.

3. The method of claim 1, wherein transferring power wirelessly to the authorized electronic devices comprises transferring a first power to a first electronic device based on the first subscription level wireless power plan and a second power to a second electronic device associated with the second subscription level wireless power plan.

4. The method of claim 1, wherein transferring power wirelessly to the authorized electronic devices comprises transferring power wireles sly to an electronic device of the one or more electronic devices after a user of the electronic device has purchased at least one of a service and a product.

5. The method of claim 4, further comprising providing the user with an access key to enable the electronic device to receive wireless power after the user has purchased at least one of a service and a product, wherein the authorization for an electronic device is further based on the access key.

6. The method of claim 1, wherein the first subscription price is higher than the second subscription price.

7. The method of claim 1, wherein the first subscription level further comprises receiving wireless power over a first geographical area, wherein the second subscription level further comprises receiving wireless power over a second geographical area, wherein the first geographical area is greater than the second geographical area.

8. The method of claim 1, wherein the first energy limit comprises a first amount total of energy received per a time period, wherein the second energy limit comprises a second amount total of energy received per the time period, wherein the first amount is greater than the second amount.

9. A method of transferring power wirelessly, the method comprising:
    enabling, via a wireless power transmitter, one or more electronic devices to access power, the enabling at least partially based on a subscription level of one of one or more wireless power plans associated with each of the one or more electronic devices, wherein the one or more wireless power plans comprise:
        a first subscription level having a first priority level and a first energy limit associated with a first subscription price; and
        a second subscription level having a second priority level and a second energy limit associated with a second subscription price, the first priority level and the first energy limit being higher than the second priority level and the second energy limit; and
    transferring power wirelessly, via the wireless power transmitter, to each enabled electronic device at least partially based on the associated wireless power plan, wherein transferring power wirelessly comprises prioritizing the transfer of the power to the one or more electronic devices based on the subscription level of the one or more wireless power plans associated with each authorized electronic device of the one or more electronic devices.

10. The method of claim 9, further comprising transmitting, via the wireless power transmitter, one or more advertisements to an enabled electronic device based on the wireless power plan associated with the enabled electronic device.

11. The method of claim 10, wherein transmitting one or more advertisements comprises transmitting a number of advertisements to the enabled electronic device, the number of advertisements transmitted being based on the associated wireless power plan.

12. The method of claim 11, further comprising performing one or more data mining operations on the enabled electronic device.

13. The method of claim 12, wherein a number of the data mining operations performed on the enabled electronic device is based on the associated wireless power plan.

14. The method of claim 9, further comprising transferring a first power to a first electronic device associated with the first subscription level wireless power plan prior to transferring a second power to a second electronic device associated with the second subscription level wireless power plan.

15. A method of transferring power wirelessly, the method comprising:
offering, via a wireless power transmitter, one or more wireless power plans to an electronic device, one of the one or more wireless power plans at least partially based on a subscription level, wherein one or more wireless power plans comprise:
a first subscription level having a first priority level and a first energy limit associated with a first subscription price; and
a second subscription level having a second priority level and a second energy limit associated with a second subscription price, the first priority level and the first energy limit being higher than the second priority level and second energy limit;
receiving, via the wireless power transmitter from the electronic device, a value identifying one of the wireless power plans; and
transferring power wirelessly, from the wireless power transmitter to the electronic device at least partially based on the identified wireless power plan, wherein transferring power wirelessly comprises prioritizing the transfer of the power to the electronic device based on the subscription level of the one or more wireless power plans associated with each authorized electronic device of one or more electronic devices.

16. The method of claim 15, wherein transferring comprises transferring a first power to a first electronic device based on the first subscription level wireless power pan prior to transferring a second power to a second electronic device based on the second subscription level wireless power plan, wherein the first subscription price is greater than the second subscription price.

17. The method of claim 15, further comprising providing a subscriber associated with the electronic device with an access key to enable the one or more electronic devices to receive wireless power.

18. The method of claim 17, wherein the power transferred to the electronic device is further based on the access key and an amount of power transferred to the one or more electronic devices.

19. The method of claim 15, wherein the wireless power plan comprises a pre-authorization to receive the power, and wherein transferring the power to comprises automatically transferring the power to the one or more electronic devices associated with the wireless power plan.

20. A device for wirelessly receiving power via a wireless power field, comprising:

means for receiving one or more offers, each offer at least partially associated with a subscription level of a wireless power plan, wherein the wireless power plan comprises:
a first subscription level having a first priority level and a first energy limit associated with a first subscription price; and
a second subscription level having a second priority level and a second enemy limit associated with a second subscription price, the first priority level and the first energy limit being higher than the second priority level and the second energy limit;
means for subscribing to one of the received offers for the wireless power plan; and
means for receiving power wirelessly at one or more electronic devices at least partially based on the wireless power plan associated with the subscribed offer, wherein means for receiving power wirelessly comprises means for receiving power wirelessly according to a priority based on the subscription level of the wireless power plan.

21. The device of claim 20, further comprising means for receiving and displaying one or more advertisements based on the subscribed offer.

22. The device of claim 20, further comprising means for enabling one or more data mining operations to be performed thereon based on the subscribed offer.

23. A method of transferring power wirelessly, the method comprising:
receiving, via a wireless power transmitter, one or more offers, each offer at least partially associated with a subscription level of a wireless power plan, wherein the wireless power plan comprises:
a first subscription level having a first priority level and a first energy limit associated with a first subscription price; and
a second subscription level having a second priority level and a second energy limit associated with a second subscription price, the first priority level and the first energy limit being hither than the second priority level and the second energy limit;
subscribing to one of the received offers for the wireless power plan; and
receiving, from the wireless power transmitter, power wirelessly at one or more electronic devices based on the wireless power plan associated with the subscribed offer, wherein receiving power wirelessly comprises receiving power wirelessly according to a priority based on the subscription level of the wireless power plan.

24. The method of claim 23, further comprising receiving one or more advertisements at the one or more electronic devices based on the subscribed offer.

25. The method of claim 23, wherein a number of advertisements received is based on the wireless power plan associated with the subscribed offer.

26. The method of claim 23, further comprising being subject to one or more data mining operations on the one or more electronic devices based on the subscribed offer.

27. The method of claim 26, wherein a number of data mining operations subjected to is based on the wireless power plan associated with the subscribed offer.

28. A method of transferring power wirelessly, the method comprising:
receiving, via a wireless power transmitter, authorization to receive power wirelessly at one or more electronic devices at least partially based on a subscription level of one of one or more wireless power plans associated with each electronic device, wherein the one or more wireless power plans comprise:
- a first subscription level having a first priority level and a first energy limit associated with a first subscription price; and
- a second subscription level having a second priority level and a second energy limit associated with a second subscription price, the first priority level and the first energy limit being higher than the second priority level and second energy limit; and receiving, via the wireless power transmitter, the power wirelessly at the one or more electronic devices based on the one or more wireless power plans, wherein receiving the power wirelessly comprises receiving the power wirelessly according to a priority based on the subscription level of the one or more wireless power plans.

29. The method of claim 28, wherein the authorization is based on the purchase of at least one of a service and a product.

30. The method of claim 29, wherein the authorization is based on an occurrence of one or more events.

31. The method of claim 30, further comprising conveying an access key to the wireless power transmitter prior to receiving the power at the one or more electronic devices.

32. The method of claim 31, wherein conveying an access key comprises conveying the access key to a router associated with the wireless power transmitter.

33. The method of claim 28, further comprising transmitting a payment to receive the power at the one or more electronic devices, the payment based on the wireless power plan, wherein transmitting a payment comprises at least one of a reoccurring transmission of the payment, transmitting a payment for the power prior to receiving authorization, transmitting the payment based for each charge received, and transmitting the payment based on an amount of power received.

34. An electronic device for wirelessly receiving power via a wireless power field, comprising:
at least one receive antenna configured for receiving power wirelessly;
a transmitter operationally coupled to the at least one receive antenna and configured to transmit information associated with a wireless power plan for the electronic device to a wireless power transmitter, wherein the electronic device is configured to receive power wirelessly from the wireless power transmitter at least partially based on a subscription level of the wireless power plan, wherein the wireless power plan comprises:
- a first subscription level having a first priority level and a first energy limit associated with a first subscription price; and
- a second subscription level having a second priority level and a second energy limit associated with a second subscription price, the first priority level and the first energy limit being higher than the second priority level and second energy limit, wherein the electronic device is further configured to receive power wirelessly according to a priority based on the subscription level of the wireless power plan.

35. The electronic device of claim 34, wherein the electronic device is configured for receiving an access key to enable the electronic device to receive wireless power.

36. The electronic device of claim 34, wherein the electronic device is configured to receive the power from the wireless power transmitter a based on an occurrence of one or more events, in anticipation of one or more events, or when a charging level of the electronic device drops below a threshold value.

37. The electronic device of claim 34, wherein the electronic device is configured to request the power from the wireless power transmitter based on anticipated power requirements.

38. The electronic device of claim 34, wherein the electronic device is configured to display a list of available wireless chargers.

* * * * *